United States Patent
Mattes et al.

(10) Patent No.: US 7,611,197 B2
(45) Date of Patent: Nov. 3, 2009

(54) OCCUPANT RESTRAINT PASSENGER SEAT ASSEMBLY WITH LOAD-SENSING ENERGY ABSORPTION FEATURE

(75) Inventors: Patrick J. Mattes, Yoder, IN (US); Erik K. Nelson, Woodburn, IN (US); Thomas R. Graham, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 131 days.

(21) Appl. No.: 11/426,493

(22) Filed: Jun. 26, 2006

(65) Prior Publication Data

US 2007/0296252 A1 Dec. 27, 2007

(51) Int. Cl.
B60N 2/42 (2006.01)

(52) U.S. Cl. .............................. 297/216.16; 297/216.14

(58) Field of Classification Search ............ 297/216.14, 297/216.13, 216.15, 216.16
See application file for complete search history.

(56) References Cited

U.S. PATENT DOCUMENTS

| | | | | |
|---|---|---|---|---|
| 2,109,728 A * | 3/1938 | Kovach | ................ | 297/216.18 |
| 2,346,895 A * | 4/1944 | Bergman | ............... | 297/216.18 |
| 3,758,092 A * | 9/1973 | McGregor | ................ | 267/131 |
| 3,838,870 A * | 10/1974 | Hug | ............................ | 297/472 |
| 4,089,545 A * | 5/1978 | Ferry | ......................... | 280/751 |
| 4,784,352 A | 11/1988 | Smith et al. | | |
| 5,685,603 A * | 11/1997 | Lane, Jr. | ................ | 297/216.11 |
| 6,109,689 A * | 8/2000 | Nanni | ...................... | 297/216.1 |
| 6,123,388 A | 9/2000 | Vits et al. | | |
| 6,142,564 A * | 11/2000 | Pajela et al. | ............ | 297/216.18 |
| 6,186,574 B1 * | 2/2001 | Motozawa et al. | ......... | 296/68.1 |
| 6,189,946 B1 * | 2/2001 | Levin | ......................... | 296/68.1 |
| 6,193,296 B1 * | 2/2001 | Motozawa et al. | ......... | 296/68.1 |
| 6,224,131 B1 * | 5/2001 | Shammout | ................ | 296/68.1 |
| 6,247,752 B1 * | 6/2001 | Bowers | .................... | 297/216.1 |
| 6,254,164 B1 * | 7/2001 | Kawamura et al. | ......... | 296/68.1 |
| 6,312,038 B1 * | 11/2001 | Kawamura et al. | ......... | 296/68.1 |
| 6,394,535 B1 * | 5/2002 | Kawamura et al. | ..... | 296/187.03 |
| 6,398,285 B2 * | 6/2002 | Motozawa et al. | ......... | 296/68.1 |
| 6,485,098 B1 * | 11/2002 | Vits et al. | .............. | 297/216.13 |
| 6,843,504 B2 * | 1/2005 | Motozawa | .................. | 280/806 |
| 6,948,756 B2 * | 9/2005 | Liu | ............................ | 296/68.1 |
| 6,953,223 B2 * | 10/2005 | Nelson et al. | .......... | 297/216.13 |
| 6,991,286 B2 * | 1/2006 | Nelson et al. | ............ | 297/216.1 |
| 7,055,901 B2 * | 6/2006 | Graham et al. | ......... | 297/216.13 |
| 7,059,675 B2 | 6/2006 | Nelson et al. | | |
| 7,182,385 B2 * | 2/2007 | Christopher | .............. | 296/65.15 |
| 7,377,590 B2 * | 5/2008 | Mattes et al. | ............... | 297/483 |
| 2001/0038233 A1 * | 11/2001 | Eklind | ................... | 297/216.13 |
| 2003/0001415 A1 * | 1/2003 | Haland et al. | .......... | 297/216.14 |
| 2004/0160095 A1 * | 8/2004 | Swierczewski | ......... | 297/216.15 |
| 2005/0146174 A1 * | 7/2005 | Maddelein et al. | ....... | 297/216.1 |
| 2005/0189800 A1 * | 9/2005 | Nelson et al. | .......... | 297/216.13 |
| 2007/0194613 A1 * | 8/2007 | Kojima | .................. | 297/344.15 |

\* cited by examiner

*Primary Examiner*—Katherine W Mitchell
*Assistant Examiner*—Philip S Kwon
(74) *Attorney, Agent, or Firm*—Jeffrey P. Calfa; Mark C. Bach

(57) ABSTRACT

A passenger seat for a multi-passenger motor vehicle having a body with a seat-mounting includes a seat frame mountable to the seat-mounting surface, and a rear seat frame engaged with the seat frame. A front frame is engaged to the seat frame and is located forward of the rear seat frame. The front frame is configured for translational movement with respect to the seat frame. A passenger restraint member is engaged to the front frame.

7 Claims, 3 Drawing Sheets

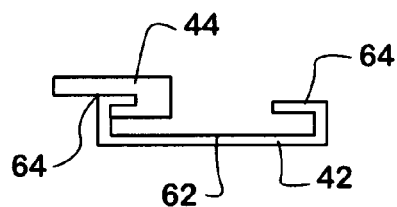
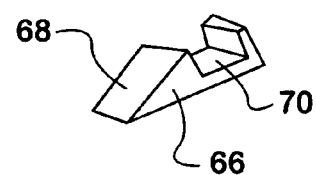
FIG. 4
FIG. 5
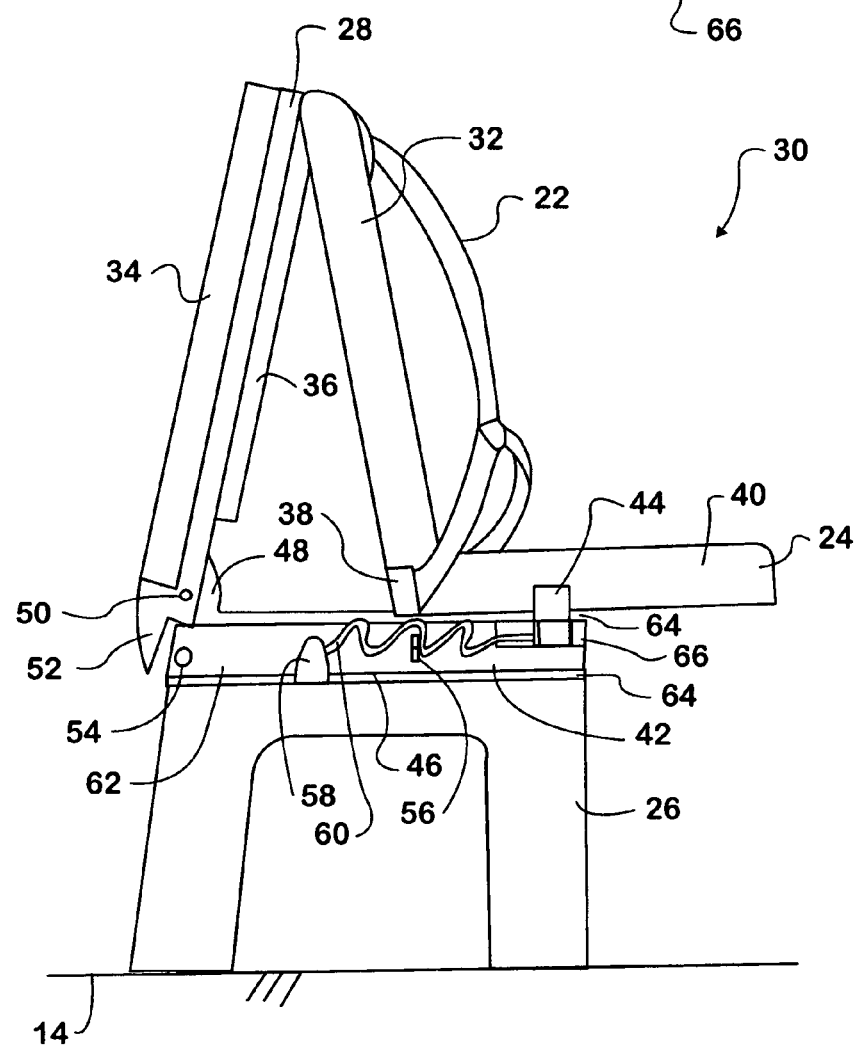
FIG. 3

OCCUPANT RESTRAINT PASSENGER SEAT ASSEMBLY WITH LOAD-SENSING ENERGY ABSORPTION FEATURE

BACKGROUND OF THE INVENTION

The present invention relates generally to passenger restraint systems in vehicles. More specifically, the present invention relates to a passenger restraining seat assembly for a bus.

Automotive vehicles commonly have three-point seat belt systems that combine a lap belt and an upper torso belt. In these systems, the tongue is swung across the person and is engaged with a buckle affixed to the seat to position one portion of the belt across the lap and another portion of the belt across the upper torso.

In school buses, however, passive restraints are commonly used. Passive restraints are restraints which do not positively restrain the occupant, but which impede the motion of the occupant within a compartment or space. The use of three-point belts in buses is not commonly incorporated because the safety requirements involved with three-point belt installation may actually conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three-point seat belt designs are also regulated under NHTSA code. These requirements relate to belts that are mounted in such a fashion that they inhibit a belted passenger's forward movement. This three-point belt-mounting requirement is codified in 49 C.F.R. Sections 571.209 and 571.210 (FMVSS 209 and FMVSS 210).

The conflict in installing three-point seat belts on bus seats is that when the three-point belt is installed, the strength of the seat for receiving impact from the occupant behind the seat is reduced. Tests have shown that in a rapid deceleration where the passenger in the front seat is buckled and the passenger in the rear seat is not buckled, the initial action is that the buckled passenger moves forward applying tension on the buckled seat belt and the component of the seat that the belt is affixed to. This results in a pulling of the fixture component in a forward direction, thereby reducing the strength on the rear impact face, and/or positioning the rear impact face of the seat forward. Following the tension applied on the three-point belt, the rear passenger likely impacts the weakened and/or displaced seat back. The reduction in seat back strength and/or change in location due to the pull on the three-point seat belt for FMVSS 210 requirements may reduce the ability of the seat back to meet the FMVSS 222 requirements.

Recent school bus seat designs have been developed that involve a pivotable inner seat for the mounting of the three-point seat belts and an immovable seat back portion for the absorption of the rear unbuckled passenger loads. The pivotable inner seat was inserted into a recess within the seat back. The seat back would be designed to deform in order to comply with FMVSS 222, while the front portion of the seat would pivot forward. Some of these designs were disclosed in U.S. Pat. Nos. 6,123,388, 6,485,098, and 6,953,223. The concept of a seat inserted within a seat was not new and was disclosed in U.S. Pat. No. 4,784,352.

Thus, there is a need for a seat that meets the various federal requirements without pivoting the front portion of the seat.

BRIEF SUMMARY OF THE INVENTION

The above-listed needs are met or exceeded by the present passenger seat for a multi-passenger motor vehicle having a body with a seat-mounting surface. The seat includes a seat frame mountable to the seat-mounting surface, and a rear seat frame engaged with the seat frame. A front frame is engaged to the seat frame and is located forward of the rear seat frame. The front frame is configured for translational movement with respect to the seat frame. A passenger restraint member is engaged to the front frame.

An alternate embodiment of a passenger seat for a multi-passenger motor vehicle having a body with a seat-mounting surface is provided. The seat includes a seat frame mountable to the seat-mounting surface and a front frame engaged to the seat frame. The front frame has a back resting portion and a lower portion. A rear seat frame is pivotally engaged with the seat frame and is located rearward of the front frame. The rear seat frame is configured for pivoting with respect to the seat frame from a first position generally parallel to the back resting portion of the front frame, to a second position pivoted towards the lower portion of the front frame. In the second position, the rear seat frame is spaced from the lower portion of the front frame. Also included is a passenger restraint member engaged to the front frame.

Another embodiment of a passenger seat for a multi-passenger motor vehicle having a body with a seat-mounting surface is also provided. The seat includes a seat frame mountable to the seat-mounting surface, and a pivotable rear seat frame engaged with the seat frame. The rear seat frame provides an obstruction to protect a passenger of a rearward seat from moving out of his or her safety zone in a forward direction in the event of a vehicle rapid deceleration. The seat also includes a front frame engaged to the seat frame and located forward of the pivotable rear seat frame. The front frame is configured for translational movement with respect to the seat frame, the front frame providing a back resting surface for a passenger. A passenger restraint member is engaged to the front frame.

BRIEF DESCRIPTION OF THE SEVERAL VIEWS OF THE DRAWINGS

FIG. 3 is a side view of the seat assembly with the movable front frame of FIG. 2 shown in the activated position;

FIG. 4 is a side view of a guide channel and a guide member of the seat assembly; and FIG. 5 is a perspective view of a stop member for the guide channel.

DETAILED DESCRIPTION OF THE INVENTION

Figure 1:
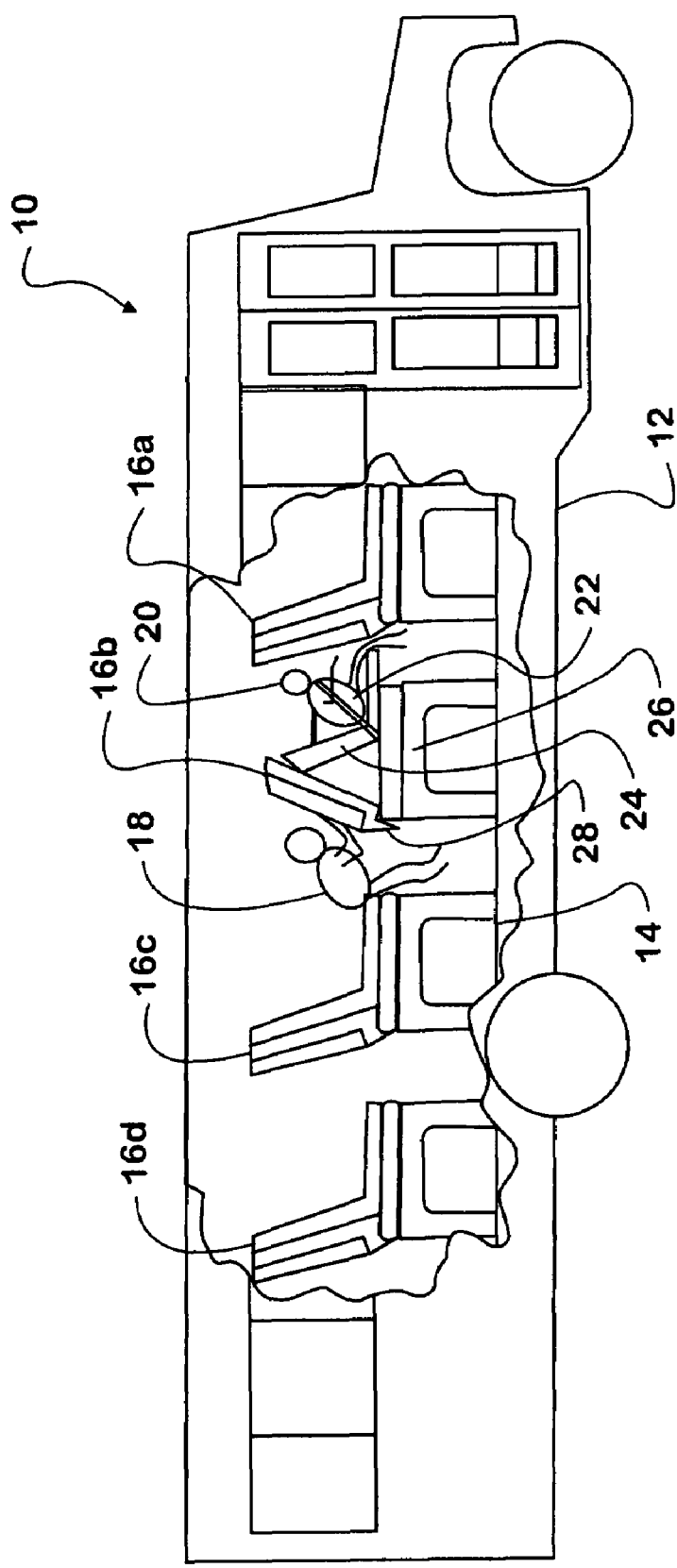
FIG. 1 is a cutaway view of a vehicle using an embodiment of the seat assembly made in accordance with this invention.

Referring now to FIG. 1, a bus or other motor vehicle 10 includes a passenger carrying body 12. The body 12 includes a mounting floor 14 for the mounting and placement of passenger seating 16. Preferably, the vehicle 10 has a series of passenger seats 16a, 16b, 16c, and 16d installed on the mounting floor 14 of the vehicle body 12 arranged from the front of the vehicle to the back of the vehicle.

In FIG. 1, a rearward passenger 18 may sit in seat 16c in front of forward passenger 20 in seat 16b. While the forward passenger 20 is buckled to the seat 16b, the rearward passenger 18 in the rearward seat 16c is not buckled in. The passenger seat 16b includes an integrated passenger restraint member 22 made in accordance with the present invention, and also includes a movable front frame 24 that the forward passenger 20 normally sits on and rests his or her back against.

The front frame 24 is mounted to a seat frame 28. The front frame 24 is also the attachment point for the upper portion of the passenger restraint 22, preferably a three-point seat belt. The seat frame 26 is mountable to the bus body mounting floor 14 and includes a rear seat frame 28. As shown in FIG. 1, the rear seat frame 28 is configured to protect a passenger 18 in the rearward seat 16c from moving out of the safety zone in a forward direction in the event of rapid deceleration. The forward seat 16b is configured to contain the passenger 18 within the area between the rear seat frame 28 of the seat 16b and the front of the rearward seat 16c.

Figure 2:
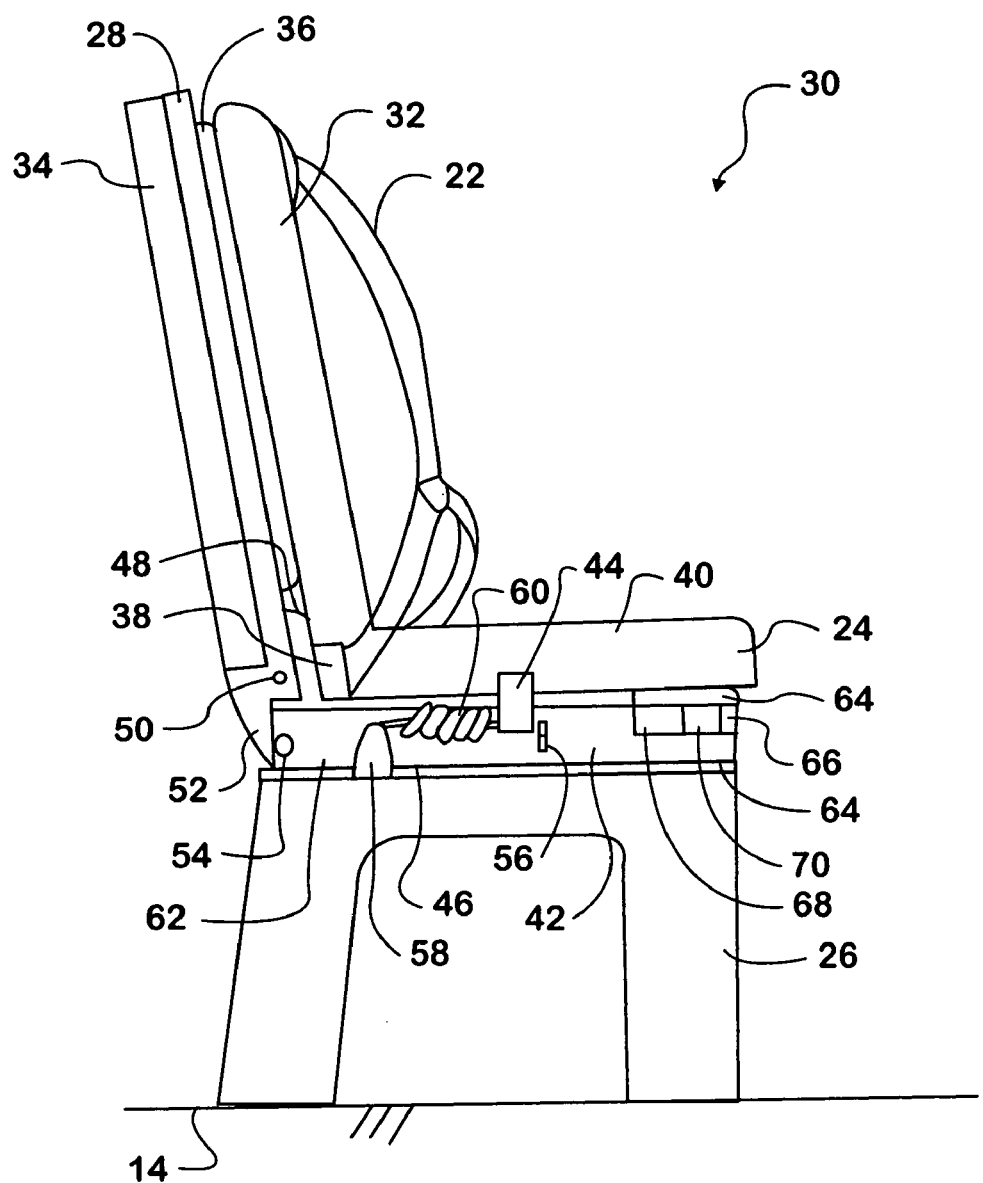
FIG. 2 is a side view of the seat assembly with a movable front frame for use with the vehicle shown in FIG. 1 and shown in the normal position.

Referring now to FIG. 2, a seat assembly 30 is shown with the front frame 24 in the normal position generally parallel to the rear seat frame 28. In the normal position, a back resting portion 32 of the front frame 24 is generally parallel to and engaging the rear seat frame 28.

Both the front frame 24 and the rear seat frame 28 preferably include cushioning for comfort and safety. In the preferred embodiment, an impact cushion 34 is located at the back side of the rear seat frame 28, and a middle cushion 36 located at the front side of the rear seat frame 28 between the front frame 24 and rear seat frame.

At least one restraint retractor 38 is preferably attached to a lower portion 40 of the front frame 24 for extending and retracting the three-point belt 22. Preferably, the three-point belt 22 may also be attached to the front frame 24 at two other locations. In the preferred embodiment, the three-point belt 22 is attached at two locations on the lower portion 40 of the front frame 24, and at one location on the upper back resting portion 32 of the front frame. As is known in the art, the three-point belt 22 encircles the passenger 20 and is configured to secure the passenger's torso against the front frame 24.

The front frame 24 is mounted to the seat frame 26 at a guide channel 42. The guide channel 42 is preferably arranged generally horizontally and generally parallel to the mounting surface 14, and is configured to receive a guide member 44 attached to the front frame 24. The guide member 44 is preferably slidably engaged with the guide channel 42 and allows the front frame 24 to translate forward and rearward with respect to the seat frame 26.

An absorption device 46 mounted to the seat frame 26 preferably maintains the front frame 24 in position adjacent the rear seat frame 28 under normal stationary or driving conditions. In the preferred embodiment, each side of seat assembly 30 has a guide channel 42 with at least one guide member 44 engaged in the guide channel. Further, it is contemplated that the guide channel 42 may be located underneath the lower portion 40 of the front frame 24 on the seat frame 26. It is also contemplated that the front frame 24 may include the guide channel 42, and the seat frame 26 may include the guide member 44.

An upper portion 48 of the seat frame 26 is preferably located above the guide channel 42 and supports the rear seat frame 28. The rear seat frame 28 is pivotably mounted to the upper portion 48 at pivot point 50. A lip portion 52 of the rear seat frame 28 preferably engages a mechanical stop 54 on the seat frame 26 to prevent the pivoting of the rear seat frame 28 in the rearward direction (counterclockwise in FIGS.). The rear seat frame 28 is maintained in the generally upright position by the mechanical stop 54 and by the front frame 24.

As seen in FIGS. 1 and 3, the front frame 24 is translated forward and generally parallel to the guide channel 42. The translation of the front frame 24 with respect to the seat frame 26 occurs when the vehicle 10 experiences rapid deceleration, as forces act on the front frame and on the passenger 20 to cause them to move in the forward direction (with respect to the decelerating vehicle 10), and when the rear seat frame 28 is impacted by the rearward passenger 18 causing the rear seat frame to pivot and push the front frame 24 forward.

Under rapid deceleration conditions, the rearward passenger 18 seated behind the seat 16 impacts the rear seat frame 28 at the impact cushion 34. The force of the impacting passenger 18 causes the rear seat frame 28 to pivot forward with respect to the seat frame 26 at pivot point 50 (clockwise in the FIGS.). The amount of loading on the rear seat frame 28 to permit the rear seat frame to pivot may be a predetermined load amount. An impact force below the predetermined load amount will not result in pivoting, and an impact force above the predetermined load amount will result in pivoting of the rear seat frame 28. Under a sufficient loading, the rear seat frame 28 pivots forward and pushes the front frame 24 to translate forward. When the front frame 24 is translated forward, the rear seat frame 28 can absorb the impact loading from rear passenger 18 while moving the forward passenger 20 away from tile location of impact. In this configuration, the forward passenger 20 is distanced from the location on the rear seat frame 28 where impact deformation may occur.

It is also contemplated that a sufficient impact loading will cause the front frame 24 to translate forward without the rear seat frame 28 pushing the front frame 24 forward. For example, the guide member 44 may be locked into position in the guide channel 42 with a lock 56 until the initial impact of the rearward passenger 18 on the rear seat frame 28 is sensed. This initial impact may be sensed when the lip portion 52 no longer contacts mechanical stop 54. When the initial impact is sensed, unlocking may be triggered by moving the lock 56 out of the path of the guide member 44. In turn, when the lock 56 is out of the path of the guide member 44, movement of the guide member in the guide channel 42 is permitted.

Further, it is contemplated that the front frame 24 may translate forward without being pushed or triggered by the rear seat frame 28. For example, the front frame 24 may translate solely due to deceleration forces acting on the front frame 24 and the passenger 20, where the deceleration forces overcome the absorption device 46.

The front frame 24 overcomes the absorption device 46 and translates forward in the guide channel 42 during rapid deceleration. The absorption device 46 is attached to the seat frame 26 at an absorption mount 58, and further, the absorption device is also attached to the front frame 24, preferably at the guide member 44. The absorption device, indicated generally at 46, preferably includes an absorption member 60, such as a mechanical spring, an air actuator or an air spring, a hydraulic actuator, a hydraulically linked spring, or any other member that is configured to maintain the front frame 24 in position adjacent the rear seat frame 28 under normal stationary or driving conditions. Additionally, a mechanism can be used to control the rate of the absorption, such as an air damper, hydraulic damper, or a magnetic damper. The absorption device 46 preferably controls both absorption of the loading and damping simultaneously. The absorption member 60 preferably links the absorption mount 58 to the guide member 44.

Under rapid deceleration conditions, the forces acting on the front frame 24 to translate the front frame in the forward direction overcome the force exerted by the absorption member 60. Under these circumstances, the guide member 44 moves in the forward direction within the guide channel 42, causing the front frame 24 to translate with respect to the seat frame 26, and causing the absorption device 46 to extend.

Referring now to FIG. 4, a side view of the guide member 44 disposed in the guide channel 42 is shown. In the preferred embodiment, the guide channel 42 has a base 62 and at least one leg 64 extending generally perpendicularly therefrom. Preferably, the guide member 44 is generally "J"-shaped and engages the leg 64 of the guide channel 42. In this configuration, the guide member 44 is slidably disposed and maintained inside the guide channel 42. While a preferred embodiment of the guide channel 42 and guide member 44 have been shown and described, variations of guide channels and guide members are contemplated.

As seen in FIGS. 2, 3 and 5, a stop member 66 is configured to confine the guide member 44 within the guide channel 42. The stop member 66 is disposed in the base 62 of the guide channel 42. In the preferred embodiment, the stop member 66 has a one-way catch design including a ramped portion 68 and a recessed portion 70. When the front frame 24 translates forward, the motion of the guide member 55 in the guide channel 42 is impeded as it engages the ramped portion 68 of the stop member 66. Depending on the amount of force the front frame 24 has when it contacts the stop member 66, the guide member 44 may travel up the ramped portion 68 and be positively received in the recessed portion 70. The stop member 66 is configured to catch the guide member 44, and to reduce the potential for rebound (reverse translational motion) of the front frame 24 within the guide channel 42. Various other embodiments of stop members are also contemplated, such as lugs, catches, or any other mechanical stop.

While particular embodiments of the present seat assembly have been shown and described, it will be appreciated by those skilled in the art that changes and modifications may be made thereto without departing from the invention in its broader aspects and as set forth in the following claims.

We claim:

1. A passenger seat for a bus, the bus having a body with a seat-mounting surface, comprising:
   a seat frame mountable to the seat-mounting surface;
   a rear seat frame engaged with the seat frame, the rear seat frame being pivotable with respect to the seat frame;
   a front frame engaged to the seat frame and located forward of the rear seat frame, the front frame having a back resting portion, the front frame is configured for translational movement with respect to the seat frame, wherein the seat frame, the rear seat frame and the front frame form the passenger seat of the bus, wherein when the front frame translates, the back resting portion does not pivot with respect to a lower portion of the front frame; and
   a passenger restraint member engaged to the front frame;
   wherein in a first position, the rear seat frame is generally parallel to the back resting portion in a reclined position, and in a second position, the rear seat frame pivots to an inclined position that is generally not parallel to the back resting portion such that the rear seat frame contacts the back resting portion only at an upper surface of the back resting portion;
   wherein a predetermined load causes the rear seat frame to pivot forward and push the front frame to translate forward;
   wherein the front frame is adapted to be a fixture of the bus.

2. The passenger seat of claim 1 further comprising a stop disposed on said seat frame, wherein said stop prevents the rearward pivoting of said rear frame.

3. The passenger seat of claim 1 further comprising an absorption device mounted on the seat frame and connected to the front frame, the absorption device having an absorption member configured to extend under rapid deceleration events.

4. The passenger seat of claim 3 wherein the absorption device comprises a spring member, an air actuator or a hydraulic actuator.

5. The passenger seat of claim 1 further comprising a stop member on the seat frame configured to engage with the front frame and impede the translational movement of the front frame.

6. The passenger seat of claim 5 wherein the stop member includes a ramped portion for impeding the translational movement of the front frame, and a recessed portion for positively receiving the front frame to prevent the reverse translational movement of the front frame.

7. A passenger seat for a bus, the bus having a body with a seat-mounting surface, comprising:
   a seat frame, mountable to the seat-mounting surface;
   a pivotable rear seat frame engaged with the seat frame, the rear seat frame forming a rear surface of the passenger seat, and the rear seat frame being pivotable with respect to the seat frame;
   a front frame engaged to the seat frame and located forward of the rear seat frame, the front frame having a back resting portion that contacts the rear seat frame, the front frame configured for translational movement with respect to the seat frame, wherein when the front frame translates, the back resting portion does not pivot with respect to a lower portion of the front frame; and
   a passenger restraint member engaged to the front frame;
   wherein when the front frame translates forward, the rear frame pivots from a reclined position towards the front frame and contacts the front frame in an inclined position only at an upper surface of the back resting portion;
   wherein a predetermined load causes the rear seat frame to pivot forward and push the front frame to translate forward; and
   wherein the front frame is adapted to be a fixture of the bus.

* * * * *